Sept. 29, 1953  A. ETIENNE  2,653,455
PROCESS FOR COLD SEPARATION OF GASEOUS MIXTURES
Filed Dec. 15, 1950  2 Sheets-Sheet 1

INVENTOR:
ALFRED ETIENNE
By Young, Emery & Thompson
Attys.

Patented Sept. 29, 1953

2,653,455

UNITED STATES PATENT OFFICE 2,653,455

PROCESS FOR COLD SEPARATION OF GASEOUS MIXTURES

Alfred Etienne, Paris, France, assignor to l'Air Liquide, Societe Anonyme pour l'Etude et l'Exploitation des Procedes Georges Claude, Paris, France Application December 15, 1950, Serial No. 201,037
In France January 4, 1950

2 Claims. (Cl. 62—175.5)

The invention relates to the art of separating mixed gases by cooling, and especially to the processes using regenerators or interchangers in which are periodically alternated the flows of a warm incoming mixture to be separated and a returning cold product of the separation between two passageways of the exchanger. In such apparatus, one or more high boiling components of the mixture are deposited as solids in a first half cycle, then re-evaporated in the other half cycle by direct contact with each of the separated products, and so on again.

Thus, the invention is particularly applicable to the separation into its components, by liquefaction and rectification, of atmospheric air containing carbon dioxide. For the sake of simplicity, the following description will be limited to this case.

A first object of the present invention is to arrange a separation plant so that it can be conducted satisfactorily without any chemical purification of the air from carbon dioxide.

A further object is to remove the carbon dioxide from the cooling apparatus without shutting down the plant.

A further object is to obtain the whole of one of the main separated products, preferably oxygen, and a part of the other, free from carbon dioxide.

These objects are attained by the new process described hereafter.

It has been suggested, in order to facilitate the sublimation of carbon dioxide settled by cooling the air, to pass in indirect contact with the air running through the coldest part of a regenerator or a reversing exchanger, a diverted gas which is hereafter recombined with the main body of said gas, e. g. a part of the cold incoming air, or a part of the cold outgoing nitrogen which will then return to the main flow of cold nitrogen and flow with it in direct contact with the metal packing of the regenerators. This process eliminates the need for any chemical removal of carbon dioxide from a portion of the air to be processed.

According to the present invention, in an apparatus wherein a gaseous mixture to be separated is cooled in a reversing heat exchange zone along a path therein progressively decreasing in temperature from end to end with resultant precipitation of a higher boiling component, which is subsequently reevaporated by direct contact with a stream of a cold product of separation passing then through the same path in an opposite direction after the first stream has ceased to flow therein, the whole stream of the said cold product of separation is divided in three parts, the first one of which is caused to flow through the path of the heat exchange zone wherein the mentioned higher boiling component has been precipitated in a previous period from the mixture to be cooled, the second part flowing through a separate path, thereby progressively increasing in temperature, from end to end along the whole length of the heat exchange zone, this second part being so recovered not contaminated by the mentioned higher boiling component, the third part flowing through another separate path along the colder part of the heat exchange zone, being then combined either with the first part or with the second one before their passing through the heat exchange zone.

As an example, in the case of the air cooled in a set of two regenerators which are alternately precooled by a flow of separated nitrogen, a portion of the separated nitrogen may be so circulated in a conventional interchanger set in a regenerator. It is to be seen that, with this arrangement, it is possible to obtain a portion of the nitrogen in an uncontaminated form.

The regenerator in which this interchanger is set on the whole length of it, is either one of both regenerators through which the nitrogen is passed in direct contact with the packing, or one or both regenerators through which the oxygen is passed in the same conditions, but such an interchanger is preferably set in each of these four regenerators. In such cases, the percentage of nitrogen that flows in this or these interchangers and is collected outwardly may be for example of about 40% of the whole separated nitrogen and be divided in 16% in each of both nitrogen regenerators and 4% in each of both oxygen regenerators. If it is desired to collect also a part or the whole of oxygen in the pure state, this oxygen is passed through a conventional interchanger extending throughout the whole length of one of both nitrogen regenerators. In the case where the entire oxygen is so collected, the nitrogen percentage which may be passed in a conventional interchanger set in one or other of both said regenerators, to be collected (uncontaminated) outwardly, may be for example 15% of the whole separated nitrogen, or 7.5% in the case where this 15% is divided between two interchangers set in the two nitrogen regenerators. The above mentioned percentages match with a pressure of about 5 atmospheres in the air to be processed and are smaller if this pressure is lower.

These figures are described hereafter.

Figure 1:
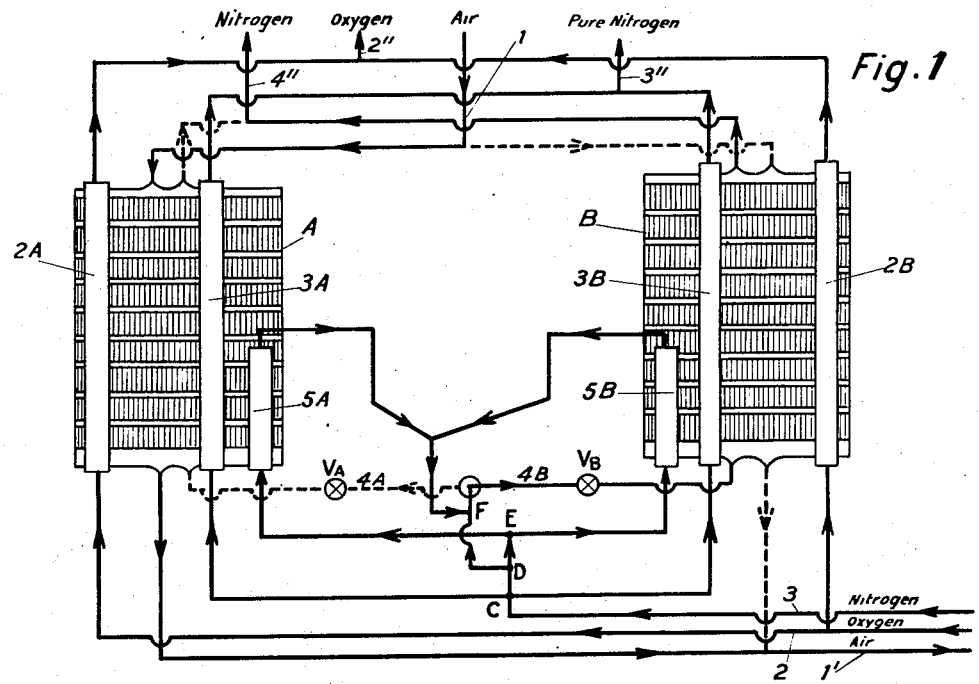
Figure 1 shows a first schematic exemplary embodiment of the present invention, applied to an air separation plant wherein regenerators operating in periodically reversing cycles are used.

Figure 1 shows the operation of the cold exchange apparatus at a given moment, whereas the pipes shown in full lines are those effectively run by gases while the others, in dotted lines, are not run by any gas.

The illustrated case is the one in which the whole of the oxygen is collected in the pure state, after being warmed in flow paths 2A and 2B, respectively in nitrogen regenerators A and B, the cold end of which is the lower end. At the shown moment, regenerator A is warmed by the incoming feed air entering through line 1 and issuing through line 1' and regenerator B is cooled by the main portion of the returning nitrogen entering through line 3. The oxygen coming from the rectifying column (not shown) through pipe 2 is divided between both flow paths 2A and 2B above mentioned, giving up its cold to the heat transfer material of regenerators A and B. Both streams of oxygen are combined at outlet 2''.

Nitrogen issuing from the rectifying column through pipe 3 is divided in C at three portions, two of which go through flow paths 3A and 3B respectively located in regenerators A and B and are then combined together, issuing in 3'', the third portion being divided again at D in two parts, the one of which flows alternately into one or other of both regenerators A and B (in B at the moment shown on Figure 1), through line 4A or 4B, being thus warmed and sweeping the deposited carbon dioxide, and issuing then in 4'', the other being divided at E passes through both flow paths 5A and 5B, respectively located in the coldest part of regenerators A and B, these two flows being joined at F when issuing from 5A and 5B to the main flow entering regenerator B (or A).

In consequence of this junction, special valves $V_A$ and $V_B$ are needed on lines 4A and 4B to take account of losses of pressure head in flow paths 5A and 5B.

Conventional valves are used for the various switchings of the streams.

To avoid mixing of the non-contaminated nitrogen being passed through flow paths 5A and 5B with the nitrogen going through regenerators A and B, the whole or a part of the nitrogen issuing from 5A and 5B may be combined with the non-contaminated nitrogen before it is passed through 3A and 3B.

Figure 2:
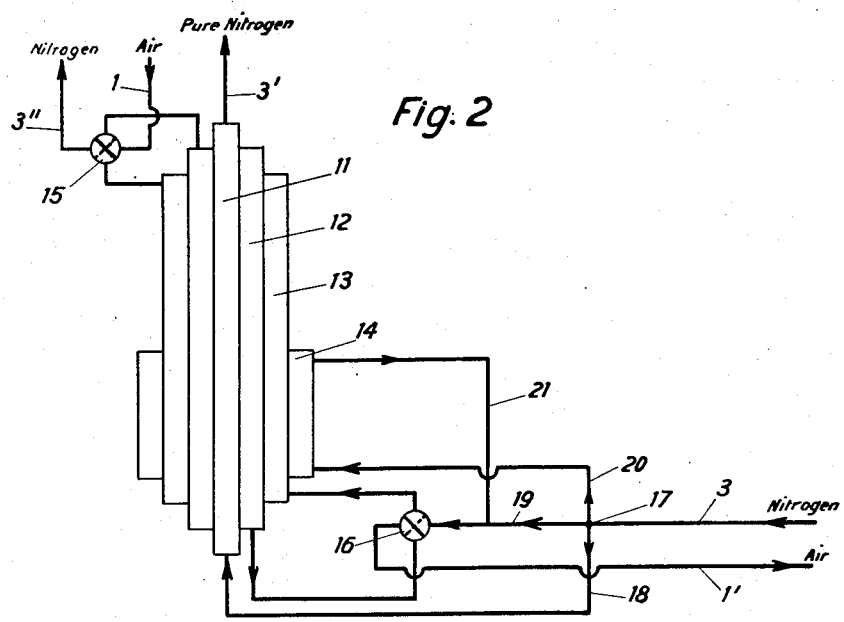
Figure 2 shows another schematic embodiment of the invention, applied to an air separation plant wherein heat reversing exchangers are used instead of regenerators.

Figure 2 shows another schematic embodiment of the invention, applied to an air separation plant wherein heat reversing exchangers are used instead of regenerators.

The shown exchanger has for its purpose to recover only the cold of the separated nitrogen. It is to be understood that the cold of the separated oxygen is recovered in another exchanger or regenerator not shown.

The exchanger has four flow paths 11 to 14, disposed in heat exchange relation with each other. Paths 11, 12, 13 are arranged on the whole length of the exchanger while path 14 is only on the colder part of it. Path 11 and 14 are continuously run in the same direction, from the cold end (lower end) towards the warm one, while paths 12 and 13, the end of which is traversed by the air to be cooled and the other by the nitrogen to be warmed are periodically interverted, by a set of two reversing valves 15 and 16.

The operation of the process of this invention in the apparatus shown in Figure 2 is as follows: the part of the air to be separated which is cooled by the returning nitrogen comes to the exchanger by a line 1, and leaves it in a cooled condition by a line 1'. The nitrogen product of rectification comes to the exchanger by a line 3, and leaves it in two distinct portions, the first one, free from carbon dioxide, by a line 3' and the other, which is the main one, contaminated by carbon dioxide and by other components of air, by a line 3''. In the shown position of valves 15 and 16, the incoming air flows through path 12, being thus cooled by nitrogen returning through paths 11, 13 and 14, and issues from the exhanger through valve 16. Line 3 leading the separated cold nitrogen, is divided at 17 in three branches, of which a first one 18 leads to the cold end of path 11, from the warm end of which this portion of nitrogen issues free from carbon dioxide, by line 3'. The second branch 19 leads to reversing valve 16, from which in the valve position shown by Figure 2, this nitrogen portion flows through path 13, so causing the re-evaporation of the carbon dioxide previously deposited by the incoming air, and then goes out through valve 15 and line 3''. The third branch 20 leads to the cold end of path 14 arranged in the colder part of the exchanger. The portion of cold nitrogen so diverted in flow path 14 is recirculated through line 21 into the main line 19, that it reheats slightly, facilitating so the removal of carbon dioxide.

Upon reversal of valves 15 and 16 to the positions shown in dotted lines, the incoming air flows through path 13 and the outgoing nitrogen through path 12, while the portion of nitrogen previously diverted through line 18 and path 11 keeps its same flow path.

Figure 3:
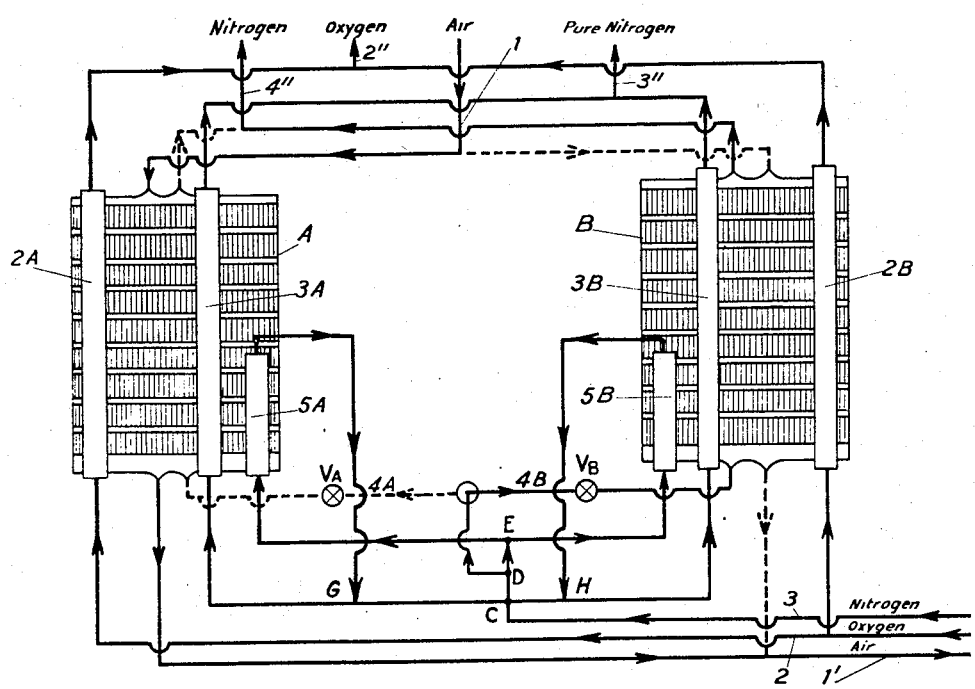
Figure 3 shows a third schematic embodiment of the invention, which is a variant of the one shown by Figure 1.

Figure 3 shows a modified embodiment of the invention applied to an air separation plant wherein regenerators operating in periodically reversing cycles are used. The difference with Figure 1 consists in that the cold nitrogen having passed, for example through flow path 5B (or 5A) located in the coldest part of regenerator B (or A) returns, not to the main flow entering regenerator B (or A) by line 4B (or 4A), but to the stream going through flow path 3B (or 3A) being joined in H (or G) with the same, and so increasing the amount of nitrogen collected in an uncontaminated form.

It is to be understood that this invention is not to be limited by any of the embodiments described herein for illustrative purpose but only in and by the following claims.

What I claim is:

1. In the method of separating a gaseous mixture into its components by liquefaction and rectification and comprising passing the mixture through a reversing heat exchange zone along a path therein progressively decreasing in temperature from one end to the other to cool the mixture and thereby effect precipitation of a component having a higher boiling point, subsequently stopping the flow of the mixture through the zone, passing a stream of a cold product of separation of the mixture through the same path of the heat exchange zone in a direction opposite that which the mixture was passed and in direct contact with the precipitated component to evaporate said component, passing a second stream of the same cold product of separation through the heat exchange zone in indirect heat exchange relation with the coldest part of said path, and combining said second stream of cold product of separation with the first mentioned stream of cold product of separation before passing the first mentioned stream of cold product of separation through the aforesaid path of the heat exchange zone, the step of passing another part of said cold product of separation through a separate path in said heat exchange zone in which latter path the temperature progressively increases from end to end along the whole length of the heat exchange zone in the direction of flow of the last mentioned part of said cold product.

2. In the method of separating a gaseous mixture into its components by liquefaction and rectification and comprising passing the mixture through a reversing heat exchange zone along a path therein progressively decreasing in temperature from one end to the other to cool the mixture and thereby effect precipitation of a component having a higher boiling point, subsequently stopping the flow of the mixture through the zone, passing a stream of a cold product of separation of the mixture through the same path of the heat exchange zone in a direction opposite that which the mixture was passed and in direct contact with the precipitated component to evaporate said component, the steps of passing a second part of the same cold product of separation through a separate path in said heat exchange zone in which latter path the temperature progressively increases from end to end along the whole length of the heat exchange zone in the direction of flow of the last mentioned part of said cold product, passing a third part of said cold product of separation in indirect heat exchange relation with the coldest part of the heat exchange zone, and combining the so treated third part of the cold product with the second part before passing the second part through the separate path along the whole length of the heat exchange zone.

ALFRED ETIENNE.

References Cited in the file of this patent

UNITED STATES PATENTS

| Number | Name | Date |
|---|---|---|
| 2,534,478 | Roberts | Dec. 19, 1950 |